United States Patent
Hsiao et al.

(10) Patent No.: US 12,091,558 B2
(45) Date of Patent: Sep. 17, 2024

(54) UV CURABLE THERMOFORMABLE CONDUCTIVE INK AND DIELECTRIC INK

(71) Applicant: Sun Chemical Corporation, Parsippany, NJ (US)

(72) Inventors: Tun-Jen Hsiao, St. Charles, IL (US); Erika Rebrosova, St. Charles, IL (US); Korey Stellmach, St. Charles, IL (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 18/685,485

(22) PCT Filed: Jul. 14, 2023

(86) PCT No.: PCT/US2023/027715
§ 371 (c)(1),
(2) Date: Feb. 21, 2024

(87) PCT Pub. No.: WO2024/015547
PCT Pub. Date: Jan. 18, 2024

(65) Prior Publication Data
US 2024/0263028 A1    Aug. 8, 2024

Related U.S. Application Data

(60) Provisional application No. 63/389,410, filed on Jul. 15, 2022.

(51) Int. Cl.
| | | |
|---|---|---|
| *C09D 11/101* | (2014.01) | |
| *B41M 7/00* | (2006.01) | |
| *C09D 11/037* | (2014.01) | |
| *C09D 11/102* | (2014.01) | |
| *C09D 11/52* | (2014.01) | |

(52) U.S. Cl.
CPC ......... *C09D 11/101* (2013.01); *B41M 7/0081* (2013.01); *C09D 11/037* (2013.01); *C09D 11/102* (2013.01); *C09D 11/52* (2013.01)

(58) Field of Classification Search
CPC ..... C09D 11/52; C09D 11/101; B41M 7/0081
See application file for complete search history.

(56) References Cited

U.S. PATENT DOCUMENTS

| | | |
|---|---|---|
| 7,364,612 B2 | 4/2008 | Sugihara |
| 7,763,670 B2 | 7/2010 | Kessel et al. |
| 8,514,545 B2 | 8/2013 | Haag |
| 8,692,131 B2 | 4/2014 | Dorfman et al. |
| 9,458,333 B2 | 10/2016 | Hall et al. |
| 10,544,317 B2 | 1/2020 | Mostowy-Gallagher |
| 2011/0118377 A1 | 5/2011 | Hauck et al. |
| 2014/0151606 A1 | 6/2014 | Lowenthal et al. |

FOREIGN PATENT DOCUMENTS

| | | |
|---|---|---|
| CN | 108410314 B | 10/2020 |
| EP | 3233477 | 4/2019 |
| EP | 3663095 | 6/2020 |
| EP | 3625295 | 7/2021 |
| WO | WO 02/50186 A1 | 6/2002 |

OTHER PUBLICATIONS

International Search Report issued in International Application No. PCT/US2023/027715, mailed Oct. 17, 2023.
Written Opinion of the International Searching Authority issued in International Application No. PCT/US2023/027715, mailed Oct. 17, 2023.

*Primary Examiner* — Khanh T Nguyen
(74) *Attorney, Agent, or Firm* — Marian E. Fundytus; Ostrolenk Faber LLP.

(57) ABSTRACT

UV curable inks comprising a polycarbonate resin; acrylated polymers or oligomers having an aromatic or aliphatic polycarbonate backbone, one or more photoinitiators; and one or more adhesion promoters, are provided, which inks can be formulated as conductive inks or dielectric inks. The UV-curable inks are useful in preparing printed electronic and injection-molded structural electronic components and devices. The UV-curable inks exhibit high elongation and thermoformability, and are especially well suited for use in injection molding processes for printed electronics and thermoformed printed electronic applications.

24 Claims, No Drawings

UV CURABLE THERMOFORMABLE CONDUCTIVE INK AND DIELECTRIC INK

CROSS REFERENCE TO RELATED APPLICATIONS

The present application is a § 371 National Phase application based on PCT/US2023/027715 filed Jul. 14, 2023, which claims the benefit of U.S. Provisional Application No. 63/389,410, filed Jul. 15, 2022 the subject matter of each of which is incorporated by reference in their entirety.

FIELD OF THE INVENTION

UV curable and high elongation thermoformable conductive inks and dielectric inks for use in injection molding processing for thermoformed printed electronic applications are provided.

BACKGROUND OF THE INVENTION

Thermoforming processes, such as vacuum thermoforming or in-molding, have been used in the preparation of, e.g., in-mold-decorative devices (IMD), in-mold-electronic devices (IME), injection-molded structural electronic devices (IMSE) and the like. During the thermoforming process, a plastic substrate, typically printed with a decorative or functional ink, e.g., a conductive ink, is heated to the substrate's softening point and stretched over a mold to form specific 3-dimensional shapes. Additional processing may also may also take place, such as injection molding, wherein the three-dimensional object is fixed into a mold, and further resin or other suitable material is added, e.g., injected into the mold, to form the final device.

Substrates include plastic films or sheets made of, e.g., polyethylene terephthalate (PET), polyethylene naphthalate (PEN), polyimide, polycarbonate (PC), and thermoplastic polyurethane (TPU). In many cases, polycarbonate is preferred due to its possessing properties such as high thermoformability, improved impact strength, and enhanced heat resistance. To be successful, inks must maintain contact with the substrate during the heating and molding steps, requiring the inks to have a similar elongation rate as the substrate, along with sufficient adhesion to the substrate.

Some difficulties have been encountered when printing on PC. Various methods and new compositions have been developed on order to improve the process of printing on PC with UV-curable inks and coatings. For example, EP 3663095 discloses a method for printing radiation-curable inks, such as radiation curable solvent-based inks, UV-curable inks or EB-curable inks, onto a polycarbonate substrate. The method involves first treating a polycarbonate sheet or film with a homogeneous liquid comprising one or more cyclic ketones and a diacetone alcohol, and subsequently inkjet printing and curing a radiation-curable ink on the treated polycarbonate substrate, which still has a limited but non-zero weight percentage of the one or more cyclic ketones.

EP3233477 discloses a radiation curable inkjet composition for generating a black color after radiation curing by UV light, the composition comprising at least one organic silver salt, at least one reducing agent for the organic silver salt, and a polymerizable composition of at least one polymerizable compound. The ink is especially useful for generating black UV light blocking borders in laminated safety glass for automotive applications, such as laminate comprising a polycarbonate layer.

Decorative inks useful in thermoformable in-mold processing are disclosed, for example, in U.S. Pat. Nos. 7,763,670 and 7,364,612, which provide thermoforming graphic inks and resins with high elongation in in-mold decoration process. U.S. Pat. No. 9,458,333 also describes an ink-jet ink or coating composition that can be used as thermoforming inks and coatings for printing onto substrates that undergo thermoforming processes.

U.S. Pat. No. 7,763,670 discloses an energy-curable ink or varnish composition for use in an in-mold decoration (IMD) process, comprising an energy-curable resin, additional reactive monomers and/or oligomers and, optionally 10% by weight or less of a solvent, wherein the resin comprises a urethane acrylate oligomer having an aromatic or aliphatic polycarbonate backbone. The ink is preferably printed on a polycarbonate substrate. U.S. Pat. No. 7,763,670 further discloses the potential to use small amounts of inert or passive resins, such as acrylics, styrene acrylates, polyesters, polycarbonates or celluloses, in the ink or varnish in order to improve adhesion of the ink or varnish. However, these inert or passive resins tend to adversely affect the resistance of the ink to the effects of injection of a backfill resin, increasing the likelihood of wash-out. Therefore, only a small amount of inert resin is recommended, for example, an amount not exceeding 10%, and preferably not exceeding 7%, by weight of the composition.

U.S. Pat. No. 7,364,612 discloses ink components and polycarbonate substrates that help stop the running of ink and substrate distortion during injection molding.

U.S. Pat. No. 9,458,333 discloses an ink-jet printable, energy-curable ink or coating composition comprising: a monofunctional urethane monomer, such as a monofunctional urethane acrylate monomer; an additional monofunctional monomer; and, optionally, a colorant, photoinitiator, stabilizer, surfactant and/or a vinyl resin, for use as a thermoforming ink or coating that, when printed onto a substrate, elongates during thermoformation to adopt the shape of a mold.

Functional inks, i.e., conductive and dielectric inks, useful in thermoforming and injection molding methods are known and have been used in electronic circuits in printed electronic thermoformed devices.

US 2014/0151606 discloses a dielectric ink, a conductive ink and a binding medium that is useful in both types of inks, which inks are useful in the manufacture of various electrical and electronic apparatus. A representative ultraviolet-curable binding medium composition comprises: a difunctional aliphatic polycarbonate urethane acrylate oligomer; a mono-functional monomer such as an isophoryl acrylate monomer or an acrylate ester monomer; a difunctional monomer such as a difunctional alkoxylated acrylate or methacrylate monomer; a first photoinitiator such as an α-hydroxyketone photoinitiator; and a second photoinitiator such as an α-aminoketone photoinitiator. A plurality of conductive particles, such as silver particles and graphene particles, are included in the binding medium to provide an ultraviolet-curable conductive ink that when cured, forms a conductive layer or wire. It is reported, without discussion or example, that additional polymers or polymeric precursors may be used, such as, polyvinyl pyrrolidone and polyvinyl acetate copolymer, to create an ink for other applications such as for thermoforming applications.

EP 3625295 discloses screen-printable, flexible and stretchable UV and thermally curable dielectric ink compositions that can be thermo or vacuum formed to prepare stretchable electronic surfaces. The dielectric ink compositions are applied on a circuit board, such as a paper-phenolic resin board, plastic board (PMMA, PET or the like), by, e.g., screen printing or the like, followed by heat and/or UV curing. The dielectric inks can be used to create a high quality IMD or IME part that contains a printed stack of mutually compatible layers that include graphic layers, conductive layers, and dielectric layers. In addition, the layers have similar elongation properties so that cracking and delamination during the thermoforming process does not occur.

U.S. Pat. No. 10,544,317 discloses thermoformable inks and coatings suitable for printed and thermoformed electronic devices. The thermoforming may be of any suitable process, such as vacuum thermoforming or in-molding (e.g. in-mold-decorative devices (IMD) or in-mold-electronic devices (IME). Conductive, dielectric and graphic inks are discussed and used in preparing devices comprising multiple stacked layers of conductive and dielectric inks.

Thermoformable conductive inks can be used in printed stacked layers of an electronic device. For example, U.S. Pat. No. 8,514,545 describes methods of making capacitive switches molded in a plastic structure and a conductive composition for thermoforming electrical circuits and capacitive switch circuits. U.S. Pat. No. 8,692,131 provides a conductive polymer thick film composition for forming conductive electrical circuits for capacitive switches.

In the injection molding process, where a high-temperature and high-pressure melting resin or resin mixer is injected onto the formed object, the printing ink must be able to resist the heat and pressure by the resin injection. U.S. Pat. No. 10,544,317 provides UV curable thermoformable conductive inks and coatings capable of being thermoformed and backfilled by injection molding without a degradation of properties during the forming and backfilling processes, and without a loss of device performance.

However, there is no description in the art related to high elongation thermoformable UV curable conductive inks with low sheet resistance and UV curable dielectric inks with high migration resistance.

Although progress has been made in the preparation of thermoformed articles, especially in the field of electrically active articles, there is a need for improvements in the materials of construction for such articles and in the manufacturing of them.

Citation or identification of any document in this application is not an admission that such represents prior art to the present invention.

SUMMARY OF THE INVENTION

Provided are UV curable conductive and dielectric inks having high elongation and excellent thermoformability, which inks are especially well-suited for use in thermoformed printed electronic applications and injection molding processes for printed electronic applications. The present conductive ink compositions, and dielectric ink and coating compositions are thermoformable, flexible, and exhibit high elongation, excellent adhesion and good ink continuity during and after thermoform processing.

The ink and coating compositions of the invention comprise:
a) about 0.5 wt % to about 20 wt % polycarbonate resin;
b) about 2 wt % to about 50 wt % of one or more acrylated polymers or oligomers having an aromatic or aliphatic polycarbonate backbone, based on the total weight of the composition;
c) about 5 wt % to about 60 wt % of one or more monofunctional, bifunctional, trifunctional, or multifunctional ethylenically unsaturated monomer or oligomer not having a polycarbonate backbone, based on the total weight of the composition;
d) about 0.5 wt % to about 15 wt % of one or more photoinitiators, based on the total weight of the composition; and
e) about 0.1 wt % to about 5 wt % of one or more adhesion promoters containing a group IV metal, in particular, organo titanium adhesion promoters, e.g., organic titanate adhesion promoters, based on the total weight of the composition.

In many embodiments, other optional materials are present, such as, one or more optional conductive materials; one or more optional antioxidants; and one or more optional additives.

The combination of the components a) polycarbonate resin; b) acrylated polymers or oligomers having an aromatic or aliphatic polycarbonate backbone; c) ethylenically unsubstituted monomers or oligomers not having a polycarbonate backbone; d) one or more photoinitiators; and e) group IV metal adhesion promoters, in particular, organo titanium adhesion promoters, are common to all conductive and dielectric inks and coatings of the present invention and can be referred to as a binder medium or ink binder.

Optional materials, such as conductive materials, antioxidants, and optional additives, may be present depending on the intended function of the ink. For example, a conductive ink, in addition to the components of the binding medium, will include conductive materials, such as silver, copper, silver coated copper, gold, bimetallic powders, carbon allotropes and metal oxides.

The UV curable conductive ink and dielectric ink or coating compositions may be applied to substrates by different printing techniques, such as flexo, gravure, digital printing and screen printing. The inventive inks and coatings are particularly well suited for application by screen printing, which is the predominant application method in the field of thermoformable printed electronic components. The resulting printed substrate can be used as is, often as an electronic device or a part of an electronic device, or is further converted through a thermoforming process and/or injection molding to form a three dimensional electronic device or a three dimensional part of an electronic device.

DETAILED DESCRIPTION OF THE INVENTION

The present invention provides both UV curable conductive ink compositions and UV-curable dielectric ink and coating compositions comprising a binder medium comprising the components a) polycarbonate resin; b) acrylated polymers or oligomers having an aromatic or aliphatic polycarbonate backbone; c) ethylenically unsaturated monomers or oligomers not having a polycarbonate backbone; d) one or more photoinitiators; and e) a group IV metal adhesion promoters, in particular, organo titanium adhesion promoters. The inks and coatings of the invention exhibit high elongation and thermoformability, and have excellent properties for use in injection molding processes. The inks and coatings are suitable for use in single layer or multilayer structures and can be used in preparing printed, thermoformed, and injection-molded electronic components.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

When the terms "consist of", "consists of" or "consisting of" is used in the body of a claim, the claim term set off with "consist of", "consists of" and/or "consisting of" is limited to the elements recited immediately following "consist of", "consists of" and/or "consisting of", and is closed to unrecited elements related to that particular claim term. The term 'combinations thereof', when included in the listing of the recited elements that follow "consist of", "consists of" and/or "consisting of" means a combination of only two or more of the elements recited.

As used herein, ranges and amounts can be expressed as "about" a particular value or range. "About" is intended to also include the exact amount. Hence "about 5 percent" means "about 5 percent" and also "5 percent". "About" means within typical experimental error for the application or purpose intended.

It is to be understood that where a numerical range is recited, it includes all values within that range, and all narrower ranges within that range, whether specifically recited or not.

As used herein, the terms "(meth)acrylate," "(meth)acrylic acid," or "acrylate" include both acrylate and methacrylate compounds, and both acrylic acid and methacrylic acid, unless specified otherwise.

As used herein, the term "binder" means a polymeric or resinous component that helps bind ink components to each other and to the printed substrate. The binder can be one polymeric or resinous component, or a combination of more than one polymeric or resinous component. The binder may serve to adhere the pigment to the substrate, or to keep a pigment uniformly dispersed in a fluid ink vehicle. When referring to the amount of binder in a composition, it refers to the weight of the material used, including the actual binder resin and any diluents or other additives present in the form in which it is used (e.g., binder in ethanol), when the recited weight is based on the total weight of the composition. When the amount of binder is recited on a solid weight basis, this refers to the amount of the actual resin (solids), after the other components (e.g., ethanol) are removed. For example, a composition may comprise 30 wt % of binder material which is a 25% solids solution in ethanol, based on the total weight of the composition. The actual binder resin (solids) that is present based on a solid weight basis is 30(0.25)=7.5 wt %.

As used herein, the term "polymer" includes both homo- and co-polymers.

As used herein, the term "article" or "articles" means a substrate or product of manufacture.

Sheet resistance (Rs), also called surface resistance, is the resistance of a square piece of a thin material as measured by contacts at two opposite sides of the square and is usually a measurement of electrical resistance of thin films that are uniform in thickness. Sheet resistance is a critical electrical property and a measure of lateral resistance per square area of a film with uniform thickness, and quantifies the ability of electrical charge to travel in the plane of the film.

Volume resistivity is the resistance to leakage current through the body of an insulating material and is equal to the sheet resistance multiplied by the thickness of the material in centimeters Dielectric breakdown is the failure of an insulating material to prevent the flow of current under an applied electrical stress. The breakdown voltage is the voltage at which the failure occurs, and the material is no longer electrically insulating.

Silver electrochemical migration is the ionic movement of silver between two adjacent traces that occurs when there is the conductive medium and a potential difference between the conductors, has been attributed to a dendritic bridge between adjacent conductors, and results in the degradation of surface insulation resistance.

Throughout this disclosure, all parts and percentages are by weight (wt % or mass % based on the total weight) and all temperatures are in ° C. unless otherwise indicated.

Compositions and Methods

The thermoformable UV curable conductive ink compositions and dielectric ink and coating compositions of the invention comprise:
  a) about 0.5 wt % to about 20 wt % polycarbonate resin;
  b) about 2 wt % to about 50 wt %, e.g., about 3 to about 40 wt %, or about 4 to about 35 wt %; of one or more acrylated polymers or oligomers having an aromatic or aliphatic polycarbonate backbone, typically a urethane acrylate polymer or oligomer having an aromatic or aliphatic polycarbonate backbone, based on the total weight of the composition;
  c) about 5 wt % to about 60 wt % of one or more monofunctional, bifunctional, trifunctional, or multifunctional ethylenically unsaturated monomer or oligomer not comprising a polycarbonate backbone, based on the total weight of the composition;
  d) about 0.5 wt % to about 15 wt % of one or more photoinitiators, based on the total weight of the composition;
  e) about 0.1 wt % to about 5 wt % of one or more organic titanate adhesion promoters, based on the total weight of the composition; and optionally,
  f) about 20 wt % to about 90 wt % of one or more conductive materials, based on the total weight of the composition;
  g) about 0.1 wt % to about 40 wt % of one or more antioxidants, based on the total weight of the composition; and/or
  h) about 0.1 wt % to about 5 wt % of one or more additives, based on the total weight of the composition.

Typically, at least one monomer or oligomer not comprising a polycarbonate backbone of component c) is a monofunctional, bifunctional, trifunctional, or multifunctional acrylate, acrylic acid, or acrylamide monomer or oligomer.

Conductive Inks

Embodiments comprising conductive inks of the invention comprise components a) through e) listed above, and further contain about 20 wt % to about 90 wt % of one or more conductive materials, such as, silver, copper, silver coated copper, gold, bimetallic powders, carbon allotropes and metal oxides.

In such embodiments where a conductive material is present in the composition:

a) the polycarbonate resin, component a), is generally present at about 1 to 6 wt %, e.g., about 1.2 to about 5 wt %, based on the total weight of the composition;
b) the acrylated polymers or oligomers having an aromatic or aliphatic polycarbonate backbone, component b), are generally present at about 2 to about 15 wt %, about 3 to about 12 wt %, or about 4 to about 10 wt %, based on the total weight of the composition; and
c) the multifunctional ethylenically unsaturated monomer or oligomer not comprising a polycarbonate backbone, component c), are generally present at about 5 to about 20 wt %, or about 6 to about 15 wt %, based on the total weight of the composition.

Dielectric Inks and Coatings

Embodiments comprising dielectric inks and coatings of the invention comprise components a) through e) listed above, but do not contain a conductive material. During the development of the invention, it was found that antioxidants, e.g., hindered phenol antioxidants, impart or enhance anti-silver migration properties to the dielectric inks, which exhibit TΩ, i.e., $10^{12}$ ohm, resistance under accelerated life testing at 85° C. and 85% humidity at 20V bias for 1200 hours.

In such embodiments where a conductive material is absent from the composition:
a) the polycarbonate resin, component a), is generally present at about 5 to 15 wt %, about 6 to about 12 wt %, or about 6 to about 10 wt %, based on the total weight of the composition;
b) the acrylated polymers or oligomers having an aromatic or aliphatic polycarbonate backbone, component b), are generally present at about 12 to about 50 wt %, about 15 to about 40 wt %, or about 20 to about 35 wt %, based on the total weight of the composition; and
c) the multifunctional ethylenically unsaturated monomer or oligomer not comprising a polycarbonate backbone, component c), are generally present at about 20 to about 60 wt %, or about 25 to about 55 wt %, or about 30 to about 52 wt %, based on the total weight of the composition.

In addition to components a-c), each of the inks of the present invention comprises one or more photoinitiators, which is common in most UV curable compositions, and one or more Group IV metal adhesion promoters, e.g., organic titanate adhesion promoters, which are not common in UV-curable inks similar to the present thermoformable inks.

While various UV curable conductive inks and dielectric inks and coatings are known, many cannot be used for printed electronic applications involving thermoform or injection molding processing due to the stringent processing requirements and performance criteria.

Also, while Group IV metal adhesion promoters are known in a variety of compositions, they are not known in thermoformable ink and coating compositions similar to those of the present invention, where both adhesion and stretchability of an ink are important features.

It has been found that metal based adhesion promoters, such as organic titanates, can be used in combination with the above photocurable materials and a non UV active resin to create a UV curable ink or coating with a combination of excellent thermoformablity, flexibility, adhesion and high elongation, which ink, when used in in a thermoforming or injection molding process also exhibits excellent ink continuity, which is vital in electric components and devices where an uninterrupted conductive pathway is essential. The compositions also exhibit good sheet resistance (Ω/sq) and electrical resistivity (Ω/sq/mil) when measured for conductive compositions, and good volume resistivity @ 500V on the order of GΩ-μm and dielectric breakdown voltage on the order of KV/mm when measured for dielectric compositions.

In the present invention, selected UV curable monomers, oligomers and polymers are combined with a non-reactive polycarbonate resin, i.e., a PC resin that is inert during cure, to enhance the overall properties of the material, such as high thermoformability, improved impact strength, and enhanced heat resistance. Other inert resins may be present in addition to the non-reactive polycarbonate resin, but typically are not required.

Other resins known in the art include polyurethanes, polyacrylic acid, carboxylic acid copolymers, homo- and co-polymers of polyesters, acrylates, methacrylates, epoxies, phenoxy resins, phenolics, polyketones, and the like.

The total amount of polycarbonate resin, or mixture of polycarbonate resin with one or more other resins, that may be present in the described UV curable conductive ink and dielectric ink and coating compositions is about 0.5 wt % to about 20 wt %, based on the total weight of the composition.

Certain polycarbonate resins particularly useful in the present invention include linear PC polymers with a Mw of about 30,000 g/mol to about 50,000 g/mol, e.g., about 35,000 to about 45,000 g/mol, and a melting point between about 310 to about 350° C., e.g., about 320 to about 340° C. Usable commercially available resins include APEC PC resins from Covestro.

Monomers useful in the invention include isobornyl acrylate, phenoxyethyl acrylate, tetrahydrofuran acrylate, (tetrahydro-2-furanyl)methyl acrylate, N-vinylpyrrolidone, N-vinylcaprolactam, acryloyl morpholine, hydroxyethyl methacrylate, dicyclopentenyloxyethyl acrylate, (tetrahydro-2-furanyl)methyl ester, tripropyleneglycol diacrylate, 1,6-hexanediol diacrylate, neopentyl glycol diacrylate, n-hexyl acrylate, isooctyl acrylate, trimethylol propane triacrylate, pentaerythritol triacrylate, ethoxy or propoxy trimethylol propane acrylate, and combinations thereof. One or more monomers from the above group can be used. One or more monomers can be monofunctional acrylates, bifunctional acrylates, trifunctional acrylates or multifunctional acrylates.

The compositions of the invention do not contain solvents, but cyclic monomers, such as isobornyl acrylate, are useful in reducing the viscosity of the inks and coatings.

UV curable oligomers useful in the invention include urethane acrylate, aliphatic urethane, polyester acrylates, urethane methacrylate, epoxy acrylates, mercapto-modified acrylates, and blends thereof. The preceding oligomers may or may not have an aromatic or aliphatic polycarbonate backbone. One or more oligomers from the above group can be used.

Photoinitiators useful in the invention include acyl phosphorus oxides, benzophenones and derivatives thereof, alpha-amino ketone, alpha-hydroxy ketones, thioxanthones, and acrylated amine synergists. Preferably, the photoinitiator is one of or a combination of 4,4'-Isopropylidenediphenol, diphenyl(2,4,6-trimethylbenzoyl)phosphine oxide, phenyl bis(2,4,6-trimethylbenzoyl) phosphine oxide, isopropylthioxanthone, 1-hydroxy-cyclohexyl-phenyl ketone, 2-hydroxy-2-methyl-1-phenyl-Propanone, and 2-Benzyl-2-(dimethylamino)-1-[4-(morpholinyl) phenyl)]-1-butanone and combinations thereof. One or more initiators from the above group can be used.

An amine synergist, may also optionally be included in the formulation. Suitable examples include, but are not limited to: aromatic amines, such as 2-(dimethylamino)

ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino)benzoic acid and other positional isomers of N,N-dimethylamino)benzoic acid esters, with ethyl, amyl, 2-butoxyethyl and 2-ethylhexyl esters being particularly preferred; aliphatic amines, such as such as N-methyldiethanolamine, triethanolamine and triisopropanolamine; aminoacrylates and amine modified polyether acrylates, such as EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER PO77F, all available from BASF; AGISYN 701, AGISYN 702, AGISYN 703, NeoRad P-81 and NeoRad P-85 all available from DSM-AGI.

Exemplary conductive materials, useful in the invention, include silver, copper, a combination of metals, such as silver coated copper, gold, bimetallic powders, graphite, graphene, carbon nanotubes, or other carbon allotropes, other metals or metal oxides, or other conductive materials such as silver coated copper, graphite, carbon. Examples of the morphology include, but is not limited to spherical particles, flakes, rods, dendritic, wires, nanoparticles, or a combination of these.

Organic titanates have proven to be very effective Group IV adhesion promoters in the invention, including alkoxytitanium esters, titanium chelates and titanium acylates. Useful compounds include titanium acetylacetonate, organic alkoxy titanates, monoalkoxy titanates, oxyacetate chelate titanates, A, b ethylene chelate titanates, quat titanates, coordinate titanates, neoalkoxy titanates, cycloheteroatom titanates, butyl (dialkyloxy (dubutoxyphosphoryloxy) titanium(trialkyloxy) titanium phosphate, tetra-n-butyl titanate, titanium ethyl acetoacetate complex, triethanolamine titanium complex, bis(ethylacetoacetato)bis(alkanolato) titanium, titanium glycol alkanolamine complex, n-butyl polytitanate, titanium ethyl acetoacetate complex, titanium IV tris isooctadecanoato-O 2-propanolato, titanium IV bis 2-methyl-2-propenoato-O, isooctadecanoato-O 2-propanolato, titanium IV 2-propanolato, tris(dodecyl)benzenesulfanato-O, titanium IV 2-propanolato, tris(dioctyl)phosphato-O, titanium IV, tris(2-methyl)-2-propenoato-O, methoxydiglycolylato, titanium IV 2-propanolato, tris(dioctyl)pyrophosphato-O, titanium IV, tris(2-propenoato-O), methoxydiglycolylato-O, titanium IV 2-propanolato, tris(3,6-diaza)hexanolato, titanium IV bis[4-(2-phenyl)2-propyl-2] phenolato oxoethylenediolato, titanium IV bis(dioctyl) pyrophosphato-O, oxoethylenediolato, (adduct) (dioctyl) (hydrogen)phosphite, titanium IV oxoethylenediolato, tris (2-methyl)-2-propenoato-O, titanium IV bis(butyl, methyl) pyrophosphato-O, oxoethylene-diolato, (adduct) bis(dioctyl)hydrogen phosphite, titanium IV bis(dioctyl)phosphato-O, ethylenediolato, titanium IV bis(dioctyl)pyrophosphato-O, ethylenediolato (adduct), bis(dioctyl)hydrogen phosphite, titanium IV bis(butyl, methyl)pyrophosphato-O, ethylenediolato, (adduct), bis(dioctyl)hydrogen phosphite, titanium IV bis(dioctyl)pyrophosphato-O oxoethylenediolato (adduct) 2 moles of 2-N,N-dimethylamino-2-methylpropanol, titanium IV bis(butyl methyl)pyrophosphato-O (adduct) 2 moles 2-N,N-dimethyiamino-2-methylpropanol, titanium IV ethylenediolato, bis(dioctyl)pyrophosphato-O bis(triethyl)amine salt, titanium IV ethylenediolato bis(dioctyl)pyrophosphato-O bis(dialkyl)amino alkyl-2-methyl propenoate, titanium IV bis(dioctyl)pyrophosphato-O ethylenediolato, (adduct) 2 moles of acrylato-O active amine, titanium IV bis(dioctyl)pyrophosphato-O ethylenediolato, (adduct) 2 moles of 2 methylpropenoamido N active amine, titanium IV bis(butyl, methyl)pyrophosphato, ethylenediolato, bis(dialkyl)amino alkyl acrylate salt, titanium IV (bis-2-propenolato-methyl)-1-butanolato, bis(dioctyl) pyrophosphato-O (adduct) 3 moles N,N-dimethylamino-alkyl propenoamide, titanium IV tetrakis 2-propanolato, adduct 2 moles (dioctyl)hydrogen phosphate, titanium IV tetrakis octanolato adduct 2 moles (di-tridecyl)hydrogen phosphite, titanium IV tetrakis(bis 2-propenolato methyl)-1-butanolato adduct 2 moles (di-tridecyl)hydrogen phosphite, titanium IV 2,2(bis 2-propenolatomethyl)butanolato tris neodecanoato-O, titanium IV 2,2(bis 2-propenolatomethyl)butanolato, iris (dodecyl)benzenesulfonato-O, titanium IV 2,2(bis 2-propenolatomethyl)butanolato, tris(dioctyl)phosphato-O, titanium IV 2,2(bis 2-propenolatomethyl)butanolato, tris(dioctyl)pyrophosphato-O, tris(2-ethylenediamino)ethylato, titanium IV 2,2(bis 2-propenolatomethyl)butanolato, tris(3-amino) phenylato, titanium IV bis octanolato, cyclo(dioctyl)pyrophosphato-O, titanium IV bis cyclo(dioctyl)pyrophosphato-O, O, isopropoxy ethyl titanium bis(acetylacetonate), titanium diisopropoxide bis(acetylacetonate), isopropoxyethoxytitanium bis(acetylacetonate) and combinations thereof.

Antioxidants useful in the dielectric compositions of the invention include pentaerythritol tetrakis(3-(3,5-di-tert-butyl-4-hydroxyphenyl)propionate), tris(2,4-di-tert-butylphenyl) phosphite, triethylene glycol bis(3-tert-butyl-4-hydroxy-5-methylphenyl)propionate, 2-methyl-4,6-bis (octylsulfanylmethyl)phenol, 1,2-bis(3,5-di-tert-butyl-4-hydroxyhydro cinnamoyl)hydrazine, 3,5-Bis(1,1-dimethylethyl)-4-hydroxybenzenepropanoic acid thiodi-2,1-ethanediyl ester. One or more antioxidants from the above group can be used.

Additives may be included in the inks and coating compositions in order to improve various properties. Exemplary additives include silicones, light stabilizers, de-gassing agents, waxes, flow promoters, defoamers, stabilizers, surfactants, dispersants, plasticizers, rheological additives, waxes, leveling agents, etc. One or more additives from the above group can be used.

Examples of specific additive compounds include polyether modified polydimethylsiloxane, polyether modified acrylic functional polydimethylsiloxane, modified polydimethylsiloxane, acrylic functional polyester modified polydimethylsiloxane, polyether modified acrylic functional polydimethylsiloxane, polyether modified polydimethylsiloxane, multi-acrylic functional, modified polydimethylsiloxane, modified, silicone-free polyether.

The inks of the present invention may optionally contain fillers, such as, for example, talc, clay, silica, boron nitride, mica, calcium carbonate, or color pigments. One or more fillers from the above group can be used. The total amount of filler that may be present in the described UV dielectric inks and coating compositions may be about 0.1 wt % to about 30 wt %, based on the total weight of the composition.

In fabricating printed electronic components, the described UV curable conductive inks and UV curable dielectric inks or coatings may be applied in one or more layers. For example, a UV curable dielectric ink or coating composition, or a UV curable conductive ink can be applied directly to the substrate. Additional layers of UV curable conductive and UV curable dielectric inks or coatings can then be applied, often in alternating layers, to provide crossover circuitry. The layers of the described dielectric UV curable inks and coatings can be arranged to insulate and protect one or more layers of UV curable conductive inks, in order to form reliable circuits for printed electronics applications.

Examples of substrates includes plastic films such as PET, PEN, polyimide, polycarbonate (PC), and thermoplastic polyurethane (TPU). For some printed electronic applications, paper and even synthetic papers or leather can be used.

In one aspect of the present disclosure, electrical components are fabricated through printing techniques, such as screen printing. The ink can be printed on hand, semi-automatic or fully automatic screen printing machines. Polyester or stainless screens with mesh count 200-640 threads/inch can be used depending on desired ink film thickness. The UV curable conductive ink or UV curable dielectric ink or coating composition is screen printed and cured by exposure to the energy emitted by a UV lamp.

The inks of the present invention can be used in any suitable thermoforming or injection molding process, and are useful in a variety articles and devices produced thereby, including, in-mold decoration, in-mold electronic devices or injection-molded structural devices.

For example, the inks and coatings of the present invention are used to provide thermoformable electronic circuits of functional parts of in-mold electronic devices. In one process, the circuit is printed, preferably using a pattern on a screen, the ink is cured on the substrate, and then thermoformed into a three-dimensional structure, wherein the entire circuit is intact and conductive. The circuit remains intact and conductive on the substrate after injection molding, where molten plastic resin was injected into the mold and flows off the substrate under heat and pressure. Examples of applications for thermoforming include in-molded capacitive switches, automotive interior parts such as instrument panels, appliance control panels, moldings, and display moldings. The inks of the present invention can be also used in non-thermoforming type electronic devices, including radio frequency identification (RFID) antenna, printed-circuit boards, smart cards (non-contact chip cards) components, smart labels, printed electronics, anti-electromagnetic interference (EMI) and anti-electrostatic materials.

EXAMPLES

The invention is further described, and the principles of the present disclosure are demonstrated, by the following non-limiting examples, including the compositions and printed articles, which further illustrate the invention, and are not intended, nor should they be interpreted, to limit the scope of the invention.

UV curable conductive inks were prepared according to the formulations shown in Table 1.

Examples 1 to 4 are inventive UV curable thermoformable conductive inks made according to the present invention. Examples 7 and 8 are comparative examples of UV curable thermoformable conductive inks.

UV curable dielectric inks and coatings were prepared according to the formulations shown in Table 2. Examples 5 and 6 are inventive UV curable thermoformable dielectric inks or coatings made according to the present invention. Examples 9 and 10 are comparative examples of UV curable thermoformable dielectric inks or coatings.

The samples were subjected to vacuum thermoforming and properties were measured before and after the samples were thermoformed.

Test Methods

The printed inks were thermoformed by using a thermoforming machine (vacuum forming or pressure forming machine) to thermoform the printed polycarbonate sheet into a three-dimensional shaped structure using a Desktop/Floor-Standing Vacuum Forming Machine 508DT/FS. The sample was heated to its softening point and then formed over a mold to specific shapes. After cooling, the shaped plastic was trimmed to result in the finished part.

Sheet Resistance ($\Omega$/Sq)

The sheet resistance was measured with a Fluke Model 289 Digital Multimeter using a UV cured screen printing of the ink on a polycarbonate substrate. To measure the resistance, probes were placed at both ends of each 600 square unit meander line resistor and the resistance value was displayed on the multimeter. To obtain the resistance value in ohms per square ($\Omega$/sq), the measured resistance ($\Omega$) was divided the by the surface area of 600 square units.

Electrical Resistivity ($\Omega$/Sq/Mil)

Electrical resistivity was determined by measuring the thickness of the print with a Mitutoyo SJ-400 surface roughness tester (Profilometer), then dividing the measured sheet resistance ($\Omega$/sq) by the thickness of the print in mils.

% Elongation

After the thermoforming process was finished, the final dimensions of the formed part was measured, including its length or any relevant dimension. The % elongation was calculated using the formula: Percentage Elongation=((Final Length−Initial Length)/Initial Length)×100.

A flexible measuring tape or Optical Measuring Systems can be used when measuring a curved surface. In many cases, a grid pattern is printed on a substrate and the measuring tape or Optical Measuring Systems can be used to measure the deformation of the grid pattern and determine the length of curved thermoformed objects.

Breakdown Voltage

Breakdown voltage was measured in accordance with ASTM D149, a standard test method designed to determine breakdown voltage for dielectric layers. A test sample was placed between electrodes and the voltage increased 500V per second until the breakdown occurs. The breakdown voltage strength is obtained by breakdown voltage dividing by the thickness of the dielectric layer.

Volume Resistivity

Volume resistivity was measured in accordance with the ASTM-D-257 D-C standard resistance or conductance of insulating materials test method, which is designed to determine volume resistivity of dielectric layers. The test sample was placed between electrodes and 500V voltage was applied across the electrodes and the corresponding current flow through the sample of the dielectric ink sample for a specific duration of 60 seconds was recorded. The resistance of the sample was calculated using Ohm's Law, which states that resistance is equal to voltage divided by current. The volume resistivity of the material was calculated using the resistance measurement and the sample geometry (thickness of prints and effective area of electrode). The volume resistivity was obtained by multiplying the resistance by the effective area of electrode and dividing by the thickness of the dielectric layer.

Electrochemical Silver Migration

Electrochemical silver migration resistance was measured in accordance with ASTM F1996-06 (at 85° C., 85% relative humidity chamber and 20V bias for 1200 hours). The Migration resistance (Ω, @85%/85° C. 20V bias for 1200 hours) test comprised application and curing of a layer of UV curable dielectric ink over silver traces using screen printing. Placing the printed sample in an environmental chamber set to a temperature of 85° C. and a relative humidity of 85% and a power source was connected to the sample, ensuring that a constant 20V bias is maintained along the silver traces. After a 1200-hour testing period under the specified environmental conditions the migration resistance values were determined using a M1501M Megohmmeter.

Conductive Ink Samples

The UV curable conductive inks were screen-printed by using a pattern of 50 or 600 squares resistors, and a screen mesh of 325 to 400. The inks were printed to a thickness of 25 to 35 μm, depending on the type of screen used. The conductive inks were cured using one or more passes through a UV radiation curing unit with a total exposure of about 600 to 2400 mJ/m², or cured using one pass of UV radiation and then thermal cure for 1 min. at 120° C. The resistance in ohms of the printed resistors was measured before and after thermoforming using a two probe Fluke Model 289 Digital Multimeter. Before thermoforming, the sheet resistance was reported in units of ohms per square of resistors. The length of the printed resistors was measured after thermoforming to determine the % elongation. After thermoforming, the sheet resistance was reported in ohms per squares.

Dielectric Ink and Coating Samples

The UV curable dielectric inks were printed as a solid full-coverage area pattern and UV cured using a single pass or two or more passes through the UV curing unit for a total exposure typically of about 600 to 1300 mJ/cm². Both the conductive and dielectric inks were cured such that they exhibit adequate cure (e.g. tape test resistance, thumb twist resistance, and/or scratch thumbnail scratch resistance) in order to avoid potential delamination during subsequent layering. The conductive and dielectric inks of the present invention are typically cured using traditional mercury vapor lamps. Alternately, it would be possible to cure using LED light sources (typically 365 nm-405 nm as known by those skilled in the art). In an optional embodiment, a thermal cure could be used in combination with UV curing.

To evaluate the electrical insulation properties of the UV curable dielectrics, breakdown voltage was measured in accordance with ASTM D149, and volume resistivity was measured after applying 500 volts direct current to the sample for 60 +5, −0 seconds, in accordance with the IPC-TM-650 test method. Electrochemical silver migration resistance was measured in accordance with ASTM F1996-06 (at 85° C., 85% relative humidity chamber and 20V bias for 1200 hours. The 85° C./85% RH accelerated life testing helps identify electrical failures caused by electrochemical silver migration that can develop because of exposure to humid conditions under operation.

The ratio of the difference in the final length and original length to the original length itself is known as percent elongation. The degree of thermoformability was rated as "excellent" if the percent elongation was greater than 100% without cracking and/or losing conductivity to the point of breaking the circuit. The degree of thermoformability was rated as "good" if cracking or loss of conductivity to the point of breaking the circuit is present at 50%-100% elongation. The degree of thermoformability was rated as "poor" if cracking or loss of conductivity to the point of breaking the circuit is present at less than 50% elongation.

Test results for conductive inks are found in Table 1. Test results for dielectric inks and coatings are found in Table 2.

TABLE 1

CONDUCTIVE INKS - Formulations and Performance Properties

| Materials | Ex. 1 (Inv) | Ex. 2 (Inv) | Ex. 3 (Inv) | Ex. 4 (Inv) | Ex. 7 (Comp) | Ex. 8 (Comp) |
|---|---|---|---|---|---|---|
| Polycarbonate resin (tetrahydro-2-furanyl)methyl ester | 2.43 10.32 | 2.43 10.32 | 1.94 8.26 | 1.46 6.19 | | |
| Aliphatic Urethane Acrylate with polycarbonate backbone | 7.75 | 7.75 | 6.20 | 4.65 | 17.44 | |
| Isobornyl Acrylate | 2.34 | 2.34 | 1.87 | 1.41 | 1.71 | |
| Aliphatic urethane diacrylate | | | | | | 8.29 |
| N-vinyl pyrrolidone | | | | | 3.85 | |
| dicyclopentenyloxyethyl acrylate | | | | | | 12.6 |
| Acidic triacrylate | | | | | | 1.37 |
| 4,4'-Isopropylidenediphenol, oligomeric reaction products with 1-chloro-2, 3-epoxypropane, esters with acrylic acid | 0.09 | 0.09 | 0.07 | 0.05 | 0.13 | 0.17 |
| Diphenyl(2,4,6-trimethyl benzoyl)phosphine oxide | 0.75 | 0.75 | 0.60 | 0.45 | 1.50 | |
| 1-Hydroxy-cyclohexyl-phenylketone | 0.14 | 0.14 | 0.12 | 0.09 | | 1.71 |
| Bis(2,4,6-trimethyl benzoyl) phenylphosphine oxide | 0.49 | 0.49 | 0.39 | 0.29 | | |
| Silicone Antifoam Compound | 0.20 | 0.20 | 0.16 | 0.12 | 0.38 | 0.51 |
| Modified, silicone-free polyether | 0.98 | 0.98 | 0.98 | 0.98 | | |
| Titanium acetylacetonate | 0.98 | 0.98 | 0.98 | 0.98 | | |
| silver flakes (D90 < 15 um) | 73.53 | | | | 75.00 | 75.00 |
| silver flakes (D90 < 2 um) | | 73.53 | | 83.33 | | |
| silver coated copper dendritic (D90 < 10 um) | | | 78.43 | | | |
| Pentaerythritol tetrakis (3-(3,5-di-tert-butyl-4- | | | | | | 0.34 |

TABLE 1-continued

CONDUCTIVE INKS - Formulations and Performance Properties

| Materials | Ex. 1 (Inv) | Ex. 2 (Inv) | Ex. 3 (Inv) | Ex. 4 (Inv) | Ex. 7 (Comp) | Ex. 8 (Comp) |
|---|---|---|---|---|---|---|
| hydroxyphenyl)propionate) | | | | | | |
| Total (%) | 100 | 100 | 100 | 100 | 100 | 100 |
| sheet resistance (Ω/sq) | <0.060 | <0.060 | <0.070 | <0.050 | unstable | unstable |
| electrical resistivity (Ω/sq/mil) | 0.045-0.050 | 0.050-0.055 | 0.040-0.045 | 0.035-0.040 | unstable | unstable |
| % elongation | >100% | >100% | >100% | 50%-100% | <50% | <50% |
| thermoformability | excellent | excellent | excellent | good | poor | poor |

TABLE 2

DIELECTRIC INKS - Formulations and Performance Properties

| Materials | Ex. 5 (Inv) | Ex. 6 (Inv) | Ex. 9 (Comp) | Ex. 10 (Comp) |
|---|---|---|---|---|
| Polycarbonate resin | 6.76 | 9.61 | | |
| (tetrahydro-2-furanyl)methyl ester | 28.73 | 40.87 | | |
| Aliphatic Urethane Acrylate with polycarbonate backbone | 21.60 | 30.71 | 69.77 | |
| Isobornyl Acrylate | 6.53 | 9.28 | 6.83 | |
| Aliphatic urethane diacrylate | | | | 24.20 |
| N-vinyl pyrrolidone | | | 15.4 | |
| dicyclopentenyloxyethyl acrylate | | | | 36.80 |
| Acidic triacrylate | | | | 4.00 |
| 4,4'-Isopropylidenediphenol, oligomeric reaction products with 1-chloro-2, 3-epoxy-propane, esters with acrylic acid | 0.25 | 0.36 | 0.50 | 0.50 |
| Diphenyl(2,4,6-trimethyl-benzoyl)phosphine oxide | 2.09 | 2.97 | 6.0 | |
| 1-Hydroxy-cyclohexyl-phenylketone | 0.40 | 0.57 | | 5.0 |
| Bis(2,4,6-trimethylbenzoyl) phenylphosphine oxide | 1.37 | 1.94 | | |
| Silicone Antifoam Compound | 0.55 | 0.78 | 1.50 | 1.50 |
| Modified, silicone-free polyether | 0.98 | 1.94 | | |
| Titanium acetylacetonate | 0.98 | 0.97 | | |
| Pentaerythritol tetrakis(3-(3,5-di-tert-butyl-4-hydroxyphenyl)propionate) | 29.27 | | | 1.00 |
| green pigment dispersion | 0.49 | | | |
| Talc | | | | 21.00 |
| Silica | | | | 6.00 |
| Total (%) | 100 | 100 | 100 | 100 |
| % elongation | >100% | >100% | 50-100% | <50% |
| [1]volume resistivity @ 500 V (GΩ-μm) | >8 | >5 | >5 | >8 |
| [2]dielectric breakdown voltage (KV/mm) | >150 | >100 | >100 | >100 |
| migration resistance (Ω, @ 85%/85° C. 20 V bias for 1200 hours) | >1 TΩ | <1 kΩ | <1 kΩ | <10 kΩ |
| thermoformability | excellent | excellent | good | poor |

[1]Volume resistivity was measured to show fitness for use for the dielectric compositions of the present invention
[2]Dielectric breakdown was measured to show fitness for use for the dielectric compositions of the present invention Examples 1-4 show UV curable conductive inks based on polycarbonate resin and an acrylated polymer or oligomer having an aromatic or aliphatic polycarbonate backbone. These UV curable conductive inks contain a variety of conductive materials and particle sizes with low sheet resistance and good to excellent thermoformability.

Examples 5-6 show UV curable dielectric inks or coating based on polycarbonate resin and an acrylated polymer or oligomer having an aromatic or aliphatic polycarbonate backbone. These UV curable dielectric inks contain a variety of additives and antioxidants with insulation and excellent thermoformability. Note that Example 5 contains 29.27% pentaerythritol tetrakis(3-(3,5-di-tert-butyl-4-hydroxyphenyl)propionate) antioxidant, which imparts the anti-silver migration properties and shows TΩ resistance with 85° C. and 85% humidity accelerated life testing method at 20V bias for 1200 hours.

Examples 7-8 are comparative conductive inks showing unstable sheet resistance and poor thermoformability.

Examples 9-10 are comparative dielectric inks showing low migration resistance and poor thermoformability.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A UV curable thermoformable ink composition, comprising:
    a) about 0.5 wt % to about 20 wt % polycarbonate resin;
    b) about 2 wt % to about 50 wt % of one or more acrylated polymers or oligomers having an aromatic or aliphatic polycarbonate backbone based on the total weight of the composition;
    c) about 5 wt % to about 60 wt % of one or more monofunctional, bifunctional, trifunctional, or multifunctional acrylate, acrylic acid, or acrylamide monomer or oligomer, wherein the monomer or oligomer does not comprise a polycarbonate backbone, based on the total weight of the composition;
    d) about 0.5 wt % to about 15 wt % of one or more photoinitiators, based on the total weight of the composition; and
    e) about 0.1 wt % to about 5 wt % of one or more organic titanate adhesion promoters, based on the total weight of the composition.

2. The thermoformable ink composition of claim 1, wherein at least one monomer or oligomer not comprising a polycarbonate backbone of component c) is a monofunctional, bifunctional, trifunctional, or multifunctional acrylate, acrylic acid, or acrylamide monomer or oligomer.

3. The thermoformable ink composition of claim 1, wherein the one or more acrylated polymers or oligomers having an aromatic or aliphatic polycarbonate backbone, b), comprise an acrylated urethane polymer or oligomer having an aromatic or aliphatic polycarbonate backbone.

4. The thermoformable ink composition of claim 1, further comprising about 20 wt % to about 90 wt % of one or more conductive materials, based on the total weight of the composition.

5. The thermoformable ink composition of claim 4, wherein the one or more conductive materials are selected from the group consisting of silver, copper, silver coated copper, gold, bimetallic powders, carbon allotropes, metal oxides and combinations thereof.

6. The thermoformable ink composition of claim 5, wherein the carbon allotropes comprise graphite, graphene, or carbon nanotubes.

7. The thermoformable ink composition of claim 4, wherein the one or more conductive materials have a morphology selected from the group consisting of spherical particles, flakes, rods, dendritic, wires, nanoparticles, or a combination of thereof.

8. The thermoformable ink composition of claim 1, further comprising about 0.1 wt % to about 40 wt % of one or more antioxidants.

9. The thermoformable ink composition of claim 1, wherein the one or more organic titanate adhesion promoters are selected from the group consisting of alkoxytitanium esters, titanium chelates and titanium acylates.

10. The thermoformable ink composition of claim 1, further comprising about 0.1 wt % to about 5 wt % of one or more additives selected from light stabilizers, de-gassing agents, waxes, flow promoters, defoamers, stabilizers, surfactants, dispersants, plasticizers, rheological additives, waxes, and leveling agents, based on the total weight of the composition.

11. The thermoformable composition of claim 10 wherein the one or more additives are selected from the group consisting polyether modified polydimethylsiloxane, polyether modified acrylic functional polydimethylsiloxane, modified polydimethylsiloxane, acrylic functional polyester modified polydimethylsiloxane, polyether modified acrylic functional polydimethylsiloxane, polyether modified polydimethylsiloxane, multi-acrylic functional modified polydimethylsiloxane, and modified silicon-free polyether.

12. The thermoformable composition of claim 1, wherein the one or more photoinitiators are selected from the group consisting of acyl phosphorus oxides, benzophenones and derivatives thereof, alpha-amino ketone, alpha-hydroxy ketones, and thioxanthones.

13. The thermoformable composition of claim 12, wherein the one or more photoinitiators comprise diphenyl (2,4,6-trimethylbenzoyl)phosphine oxide, phenyl bis(2,4,6-trimethylbenzoyl) phosphine oxide, isopropylthioxanthone, 1-hydroxy-cyclohexyl-phenyl ketone, 2-hydroxy-2-methyl-1-phenyl-Propanone, and 2-Benzyl-2-(dimethylamino)-1-[4-(morpholinyl) phenyl)]-1-butanone and combinations thereof.

14. The thermoformable composition of claim 1, further comprising an amine synergist.

15. The thermoformable composition claim 14, wherein the amine synergist is acrylated.

16. The process of claim 15, wherein curing comprises UV-curing, UV-LED curing, or a combination of thermal curing with UV-curing or UV-LED curing.

17. The thermoformable composition of claim 1, wherein the composition is suitable for application on a substrate by screen printing, flexographic, gravure and digital printing.

18. The thermoformable composition of claim 1, further comprising one or more colorants and/or about 0.1 wt % to about 30 wt % of one or more fillers, based on the total weight of the composition.

19. The thermoformable composition of claim 18, wherein the one or more fillers are selected from the group consisting of talc, clay, silica, boron nitride, mica, calcium carbonate and combinations thereof.

20. A process for preparing a thermoformed article, comprising printing the composition of claim 1 onto a substrate; curing the composition; and then thermoforming the printed and cured substrate.

21. A printed article comprising the composition of claim 1.

22. The printed article of claim 21 which is a thermoformed article.

23. The printed article of claim 21, which is an electronic component or finished electronic device.

24. The printed article of claim 21, further comprising one or more additional graphics inks.

* * * * *